J. Fasig,

Hay Knife.

N° 52,279. Patented Jan. 30, 1866.

Witnesses:

Inventor:
John Fasig

UNITED STATES PATENT OFFICE.

JOHN FASIG, OF WEST SALEM, OHIO.

IMPROVEMENT IN HAY AND PRUNING KNIVES.

Specification forming part of Letters Patent No. 52,279, dated January 30, 1866.

*To all whom it may concern:*

Be it known that I, JOHN FASIG, of West Salem, in the county of Wayne and State of Ohio, have invented certain new and useful Improvements in a Hay and Pruning Knife, being a new article of manufacture; and I do hereby declare that the following is a full and complete description of the construction of the same, reference being had to the accompanying drawings, making a part of this specification, in which—

Figure 1:
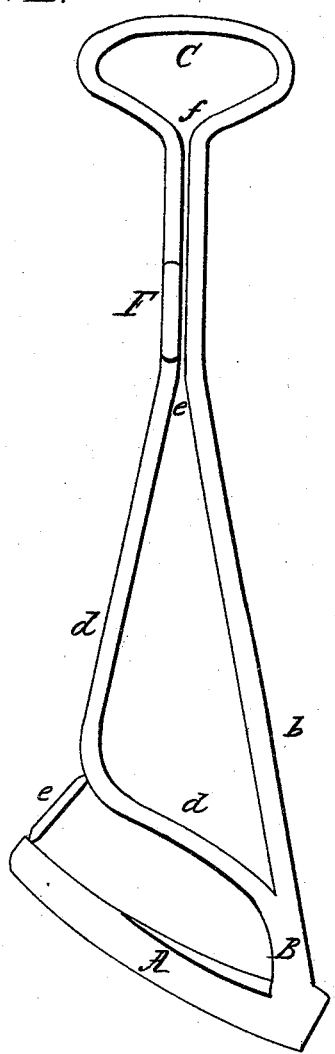
Figure 2:
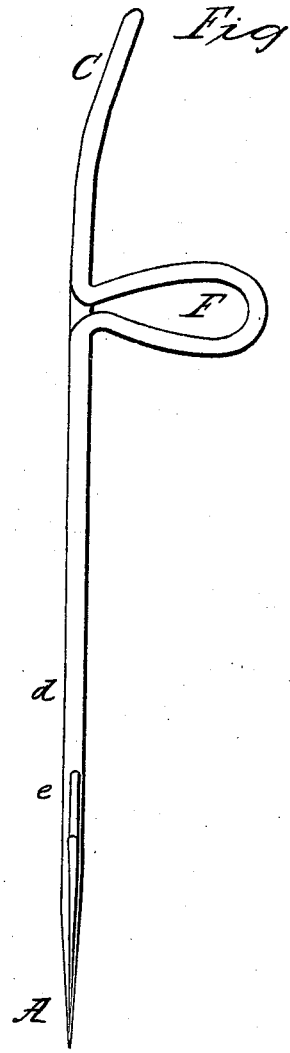

Figure 1 is a side view of the knife. Fig. 2 is an end view.

Like letters of reference refer to like parts.

My improvement relates to the construction of a hay-knife that can be used also for pruning, which will be described as follows.

In the figures, A is the cutting-edge or blade of the knife, that is of the shape represented, and is in an inclined position. From one end of the blade extends up the handle, that consists of a shank, B, which divides or branches off into rods $b\ d$, one of which extends upward and the other along parallel with the blade. These rods come close together at the upper part of the handle, from $e$ to $f$, above which the rod is curved round, forming a place, C, for the hand, and on one side a handle, F, is made by the rod turning outward, as shown in Fig. 2. Thus a place is formed in the frame of the handle for each hand.

$e$ is a brace attached to the other end of the knife and frame $d$, as seen in Figs. 1 and 2.

The blade is made of steel and the handle of wrought-iron in one entire piece, as represented, being very economical in its construction, and the frame forming the handle is sufficiently strong to sustain any amount of force required in cutting hay or pruning, being equally well adapted for both purposes.

What I claim as my improvement, and desire to secure by Letters Patent, is—

The combined hay and pruning knife, when constructed and arranged as set forth.

JOHN FASIG.

Witnesses:
  W. H. BURRIDGE,
  F. ALDEN.